(12) United States Patent
Kumawat et al.

(10) Patent No.: US 11,449,344 B1
(45) Date of Patent: Sep. 20, 2022

(54) REGULAR EXPRESSION PROCESSOR AND PARALLEL PROCESSING ARCHITECTURE

(71) Applicant: Xilinx, Inc., San Jose, CA (US)

(72) Inventors: Sachin Kumawat, San Jose, CA (US); Hare Krishna Verma, San Jose, CA (US); Vincent Mirian, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 256 days.

(21) Appl. No.: 16/854,441

(22) Filed: Apr. 21, 2020

(51) Int. Cl.
*G06F 9/38* (2018.01)

(52) U.S. Cl.
CPC .................. *G06F 9/3885* (2013.01)

(58) Field of Classification Search
CPC ..................................... G06F 9/3877
See application file for complete search history.

(56) References Cited

U.S. PATENT DOCUMENTS

| | | | | |
|---|---|---|---|---|
| 5,787,273 A | * | 7/1998 | Runaldue | G06F 5/10 713/500 |
| 7,225,188 B1 | * | 5/2007 | Gai | G06F 16/90339 |
| 7,523,434 B1 | | 4/2009 | Taylor et al. | |
| 7,640,526 B1 | | 12/2009 | Blodget et al. | |
| 8,402,409 B1 | | 3/2013 | Janneck et al. | |
| 8,862,603 B1 | * | 10/2014 | Watson | G06F 16/90344 707/804 |
| 9,218,862 B1 | * | 12/2015 | Grenier | G11C 8/12 |
| 10,289,093 B1 | | 5/2019 | Lysaght et al. | |
| 10,613,875 B1 | | 4/2020 | Lysaght et al. | |
| 2008/0270342 A1 | * | 10/2008 | Ruehle | G06F 16/90344 |
| 2008/0271141 A1 | * | 10/2008 | Goldman | H04L 63/1416 726/22 |
| 2011/0025376 A1 | | 2/2011 | Gritke | |
| 2011/0302394 A1 | * | 12/2011 | Russell | G06F 9/3887 712/222 |
| 2013/0311495 A1 | * | 11/2013 | Rossi | G06F 9/4498 707/758 |

(Continued)

OTHER PUBLICATIONS

Van Lunteren, Jan, et al. "Designing a programmable wire-speed regular-expression matching accelerator." 2012 45th Annual IEEE/ACM International Symposium on Microarchitecture. IEEE, 2012. pp. 461-472. (Year: 2012).*

(Continued)

*Primary Examiner* — Keith E Vicary
(74) *Attorney, Agent, or Firm* — Kevin T. Cuenot

(57) ABSTRACT

A processing circuit includes a random access memory (RAM) configured to look up a first next state based on a first address simultaneously with looking up a second next state based on a second address. The first address is formed of a first current state and an input data and the second address is formed of a second current state and the input data. The processing circuit includes a state control circuit that receives the first and second next states, the first current state, and the second current state, and a first-in-first-out (FIFO) memory that stores selected ones of the first and second next states, the first current state, and the second current state. The processing circuit includes a multiplexer configured to selectively pass two states from the FIFO memory or two states from the state control circuit as a third current state and a fourth current state.

13 Claims, 7 Drawing Sheets

(56) References Cited

U.S. PATENT DOCUMENTS

| | | | | |
|---|---|---|---|---|
| 2015/0055481 | A1* | 2/2015 | Guo | H04L 63/0245 370/238 |
| 2015/0067123 | A1* | 3/2015 | Goyal | H04L 63/1408 709/223 |

OTHER PUBLICATIONS

Gogte, Vaibhav, et al. "HARE: Hardware accelerator for regular expressions." 2016 49th Annual IEEE/ACM International Symposium on Microarchitecture (MICRO). IEEE, 2016. 12 total pages. (Year: 2016).*

Sidhu, Reetinder, and Viktor K. Prasanna. "Fast regular expression matching using FPGAs." The 9th Annual IEEE Symposium on Field-Programmable Custom Computing Machines (FCCM'01). IEEE, 2001. 12 total pages. (Year: 2001).*

Yang, Yi-Hua E., Weirong Jiang, and Viktor K. Prasanna. "Compact architecture for high-throughput regular expression matching on FPGA." Proceedings of the 4th ACM/IEEE Symposium on Architectures for Networking and Communications Systems. 2008. pp. 30-39. (Year: 2008).*

Atasu, Kubilay, et al. "Hardware-accelerated regular expression matching with overlap handling on IBM poweren processor." 2013 IEEE 27th International Symposium on Parallel and Distributed Processing. IEEE, 2013. pp. 1254-1265. (Year: 2013).*

Yun, Qu, Yi-Hua E. Yang, and Viktor K. Prasanna. "Multi-stream regular expression matching on FPGA." 2011 International Conference on Reconfigurable Computing and FPGAs. IEEE, 2011. pp. 86-91. (Year: 2011).*

Sourdis, Ioannis, et al. "Regular expression matching in reconfigurable hardware." Journal of Signal Processing Systems 51.1 (2008): 99-121. (Year: 2008).*

Eslami, F. et al., "Enabling Effective FPGA Debug using Overlays: Opportunities and Challenges," In 2nd Int'l. Workshop on Overlay Architectures for FPGAs (OLAF2016), Feb. 21, 2016, 6 pg.

Haenel, V., "2.8. Interfacing with C," [online] Scipy Lecture Notes [retrieved Aug. 11, 2017] retrieved from the Internet: <http://www.scipy-lectures.org/advanced/interfacing_with_c/interfacing_with_c.html>, 31 pg.

Catanzaro, B. et al., "SEJITS: Getting Productivity and Performance with Selective Embedded JIT Specialization," Programming Models for Emerging Architectures, vol. 1, No. 1, Oct. 2009, pp. 1-10.

Capalija, D. et al., "Tile-based Bottom-up Compilatoin of Custom Mesh-of-Functional-Units FPGA Overlays," In IEEE 24th Int'l. Conf. on Field Programmable Logic and Applications (FPL), Sep. 2, 2014, 34 pg.

"Very high-level programming language," [online] Wikipedia, the free encyclopedia, Jun. 25, 2017, retrieved from the Internet: <https://en.wikipedia.org/w/index.php?title=Very_high-level_programming_language&oldid=787427362>, 2 pg.

"Amazon EC2 F1 Instances," [online] Amazon Web Services, Inc. © 2017 [retrieved Aug. 11, 2017], retrieved from the Internet: <https://aws.amazon.com/ec2/instance-types/f1/>, 14 pg.

Alfke, P., "Created Uses of Block RAM," Xilinx, Inc., White Paper: Virtex and Spartan FPGA Families, WP335 (v1.0), Jun. 4, 2008, 5 pg.

Maxfield, M., "Tutorial: Linear Feedback Shift Registers (LFSRs)—Part 1," [online] EE Times © 2018 UBM Electronics, An AspenCore company, Dec. 20, 2006 [retrieved Mar. 13, 2018], retrieved from the Internet: <https://www.eetimes.com/document.asp?doc_id=1274550>, 5 pg.

"From Regular Expression to NFA to DFA ," [online] SNS Courseware, Compiler design—RE&DFA&NFA, [retrieved Oct. 20, 2017], retrieved from the Internet: <https://tajseer.files.wordpress.com/2014/06/re-nfa-dfa.pdf>, 9 pg.

"Regular Expression to NFA (Non-Deterministic Finite Automata)," [online] HackingOff,com © 2012 [retrieved Mar. 20, 2018], retrieved from the Internet: <http://hackingoff.com/compilers/regular-expression-to-nfa-dfa>, 1 pg.

"Convert simple regular expressions to deterministic finite automaton Regex => NFA => DFA," [online] CyberZHG's Toolbox [retrieved Mar. 20, 2018], retrieved from the Internet: <https://cyberzhg.github.io/toolbox/nfa2dfa>, 2 pg.

"Deterministic finite automaton," [online] Wikipedia, the free encyclopedia, Nov. 29, 2017, retrieved from the Internet: <https://en.wikipedia.org/wiki/Deterministic_finite_automaton>, 6 pg.

Nakahara, H. et al., "A regular expression matching circuit based on a decomposed automaton," In International Symposium on Applied Reconfigurable Computing, Mar. 23, 2011, 12 pg.

"Non-Deterministic finite automaton," [online] Wikipedia, the free encyclopedia, Mar. 3, 2018, retrieved from the Internet: <https://en.wikipedia.org/wiki/Nondeterministic_finite_automaton>, 8 pg.

Yamagaki, N. et al., "High-speed regular expression matching engine using multi-character NFA," In IEEE International Conference on Field Programmable Logic and Applications, FPL 2008, Sep. 8, 2008, pp. 131-136.

Cox, R., Regular expression matching can be simple and fast (but is slow in java, perl, php, python, ruby, . . . ), Jan. 2007, retrieved from the Internet: <http://swtch. com/~ rsc/regexp/regexp1. html (дата обращения: 29 ноября 2010 г.)>, 18 pg.

Thompson, K., "Programming techniques: Regular expression search algorithm," Communications of the ACM, vol. 11, No. 6, pp. 419-422, Jun. 1, 1968.

* cited by examiner

| 300 | IN | CS | DIFF | NS |
|---|---|---|---|---|
| | b | SI | 0 | S0 |
| | $chars-b | SI | 0 | SI |
| | a | S0 | 1 | S1 |
| | $chars-a | S0 | 1 | SF0 |
| | $term | S1 | 1 | SF1 |
| | $chars-$term | S1 | 1 | SF0 |

REGULAR EXPRESSION PROCESSOR AND PARALLEL PROCESSING ARCHITECTURE

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to integrated circuits (ICs) and, more particularly, to a regular expression processing circuit and parallel processing architecture for an IC.

BACKGROUND

A "regular expression" or "regex" is a text string that defines a search pattern. Typically, a processor, e.g., a central processing unit (CPU), is capable of executing an application that includes a regex engine. The regex engine, when executed, is capable of processing received input data using the regular expression to determine whether the data matches the search pattern defined by the regular expression. Regular expressions are widely used across many different industries. For example, regular expressions are often used in applications in the fields of bioinformatics, Structured Query Language (SQL) query and search, signal intelligence, and network processing (e.g., network intrusion and safety detections).

In many cases, CPUs lack the processing power and bandwidth necessary to perform regular expression processing in real time. As an example, CPUs are capable of providing data throughputs in the range of approximately 100-200 Mbps. This capability is often insufficient to provide regular expression processing that is responsive in real time.

SUMMARY

In one aspect, a processing circuit includes a random access memory (RAM) configured to look up a first next state based on a first address simultaneously with looking up a second next state based on a second address. The first address is formed of a first current state and an input data and the second address is formed of a second current state and the input data. The processing circuit can include a first-in-first-out (FIFO) memory configured to store selected ones of the first and second next states, a first prior state, and a second prior state as active states. The processing circuit can include a multiplexer configured to selectively pass two active states from the FIFO memory or two states selected from the first and second next states and the first and second prior states as a third current state and a fourth current state corresponding to a next clock cycle. The third current state and the fourth current state corresponding to the next clock cycle are used to look up further next states from the RAM.

In another aspect, a method includes forming a first address from a first current state and an input data and a second address from a second current state and the input data, looking up, using the RAM, a first next state based on the first address simultaneously with looking up a second next state based on the second address, and selectively storing, within a FIFO memory, selected ones of the first and second next states, a first prior state, and a second prior state as active states. The method can include selectively passing two active states from the FIFO memory or two states selected from the first and second next states and the first and second prior states as a third current state and a fourth current state corresponding to a next clock cycle. The third current state and the fourth current state corresponding to the next clock cycle can be used to look up further next states from the RAM.

In another aspect, a system can include a scheduler configured to receive input data and a plurality of buffers coupled to the scheduler. Each buffer can include a plurality of ports. The scheduler can write pages of the input data into respective ones of the plurality of buffers. The system can include a plurality of regular expression processing circuits, wherein each buffer of the plurality of buffers has at least a first regular expression processing circuit connected to a first port and a second regular expression processing circuit connected to a second port. Each of the plurality of regular expression processing circuits can operate on the pages of the input data in parallel.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
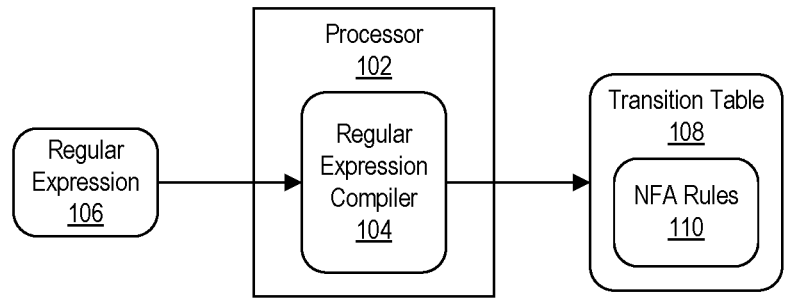
FIG. 1 illustrates an example of a processor generating non-deterministic finite automata rules for programming a regular expression processing circuit.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to a regular expression processing circuit and parallel processing architecture for an IC. In accordance with the inventive arrangements described within this disclosure, a regular expression processing circuit is described that is capable of providing improved performance compared to other regular expression processing solutions that rely on central processing units (CPUs) executing program code.

In one aspect, the regular expression processing circuit is implemented as a non-deterministic finite automata (NFA) machine. An NFA machine can be mapped one-to-one with a unique finite automaton. An NFA machine, unlike other technologies that use backtracking, matches input strings in a beginning to ending fashion. Once, an NFA machine is built from a regular expression, any new character of an input string transitions the NFA machine from a current set of active states to a next set of active states. When the NFA machine encounters, or hits, one of the final states, the NFA machine indicates that the regular expression is matched.

In accordance with the inventive arrangements described herein, the regular expression processing circuit utilizes a transition scheme to process regular expressions. The regular expression processing circuit is capable of processing streaming input strings by transitioning through NFA rules programmed into a multi-ported memory. The NFA rules are specific to a particular regular expression. The multi-ported nature of the memory is leveraged to provide improved, e.g., faster, processing of the streaming input strings. The regular expression processing circuit is runtime configurable in that the regular expression processing circuit may be reconfigured to process data based on different regular expressions over time by loading different NFA rules therein that are specific to each different regular expression to be used.

In another aspect, a plurality of regular expression processing circuits may be used to implement a parallel processing architecture. In one aspect, the parallel processing architecture utilizes a greedy load balancer to stream pages of input data to multiple different ones of the regular expression processing circuits operating in parallel, e.g., concurrently.

The regular expression processing circuits and the parallel processing architecture described may be implemented in any of a variety of different types of devices. In one aspect, the regular expression processing circuit(s) and/or parallel processing architecture may be implemented in a programmable IC. In the case of a programmable IC implementation, the programmable IC is initially configured to implement the regular expression processing circuit(s) and/or parallel processing architecture by loading one or more configuration bitstreams therein. Once configured, the regular expression processing circuits and/or parallel processing architecture may be loaded with different NFA rules during runtime (e.g., without reconfiguring the programmable circuitry of the programmable IC by loading a different configuration bitstream) to process data according to a different regular expression.

In another aspect, the regular expression processing circuit(s) and/or the parallel processing architecture may be implemented as hardened circuitry. For example, the regular expression processing circuit(s) and/or the parallel processing architecture can be implemented in an Application Specific Integrated Circuit (ASIC).

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of a processor generating NFA rules for programming a regular expression processing circuit. In the example of FIG. 1, a processor 102 is capable of executing program code such as a regular expression compiler 104. Processor 102 is capable of receiving a regular expression 106 as input. In executing regular expression compiler 104, processor 102 is capable of generating a transition table 108. Transition table 108 specifies one or more NFA rules 110 that may be loaded into a regular expression processing circuit. When loaded, NFA rules 110 may be executed by the regular expression processing circuit to process received input data (e.g., a data stream) to determine whether the input data matches regular expression 106.

In one aspect, regular expression compiler 104, when executed by processor 102, is capable of compiling regular expression 106 into an NFA intermediate representation (IR). Regular expression compiler 104 is capable of further processing the NFA IR to generate transition table 108. NFA rules 110 may be implemented as NFA transition instructions that may be programmed into one or more of the regular expression processing circuits.

Figure 2:
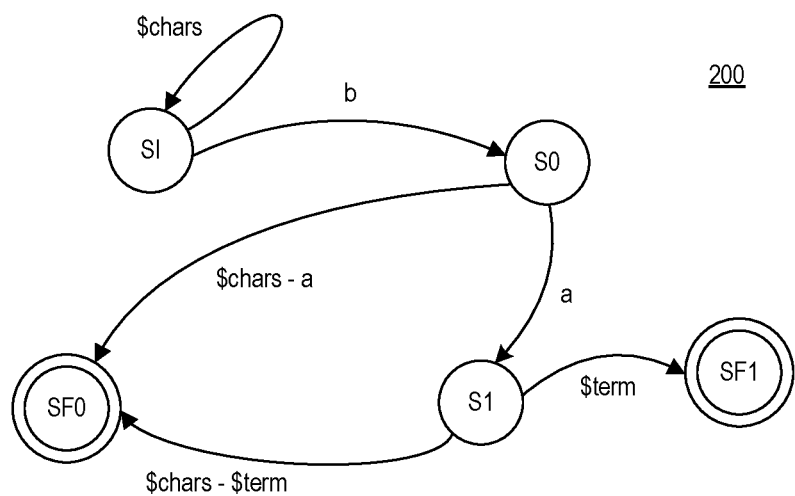
FIG. 2 illustrates an example of a non-deterministic finite automata intermediate representation.

FIG. 2 illustrates an example NFA IR 200. Regular expression compiler 104, for example, may generate NFA IR 200 in processing regular expression 106. NFA IR 200 may be specified as a graph. For purposes of illustration, NFA IR 200 corresponds to the regular expression "^.*ba$". The term "$chars" denotes all possible values of the input characters IN and the term "$term" denotes a special character indicating string termination. It should be appreciated that regular expression compiler 104 can process any of a variety of regular expressions of varying complexity and that the particular regular expression provided herein is for purposes of illustration only.

Figures 3, 4:
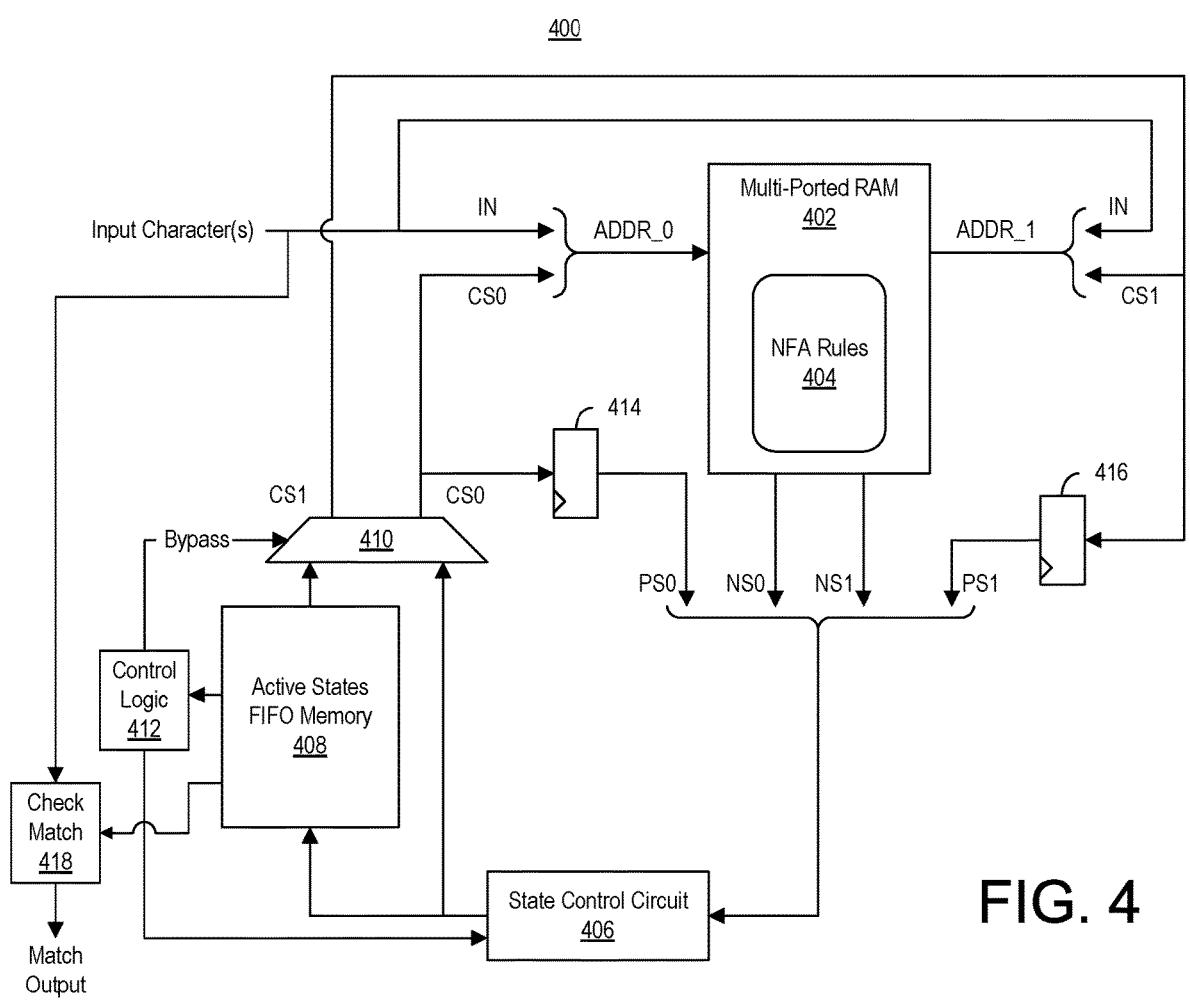
FIG. 3 illustrates an example transition table.
FIG. 4 illustrates an example of a regular expression processing circuit.

FIG. 3 illustrates an example transition table 300. Continuing with the example where regular expression 106 is "^.*ba$", regular expression compiler 104 is capable of generating transition table 300. For purposes of discussion and with reference to FIG. 3, the next input character to be processed in a stream of input data is denoted as "IN" (e.g., the first column of table 300 moving left to right). The current state is denoted as "CS" (e.g., second column), while the next state is denoted as "NS" (fourth column). A set of states that are active in the NFA for a given moment are called active states and are denoted as "AS." In addition, a flag called "DIFF" (e.g., third column) is defined that indicates whether the CS should remain in the set of AS after a current transition is completed.

Within transition table 300, each partial row formed of the data from columns DIFF and NS corresponds to an NFA rule (one of NFA rules 110). The portion of each row formed by the IN column and the CS column specifies an address at which each respective NFA rule is stored in a memory. For example, referring to the first row, the NFA rule {0, S0} is stored at address {b, SI} within the memory. FIG. 3 is provided for purposes of illustration. In an actual implementation, the various rows (e.g., the second row) would be expanded with additional entries corresponding to all the possible characters that can be received for that row.

An example compute flow as performed by a regular expression processing circuit programmed with NFA rules 110 of FIG. 1 is shown in Example 1 below. The instructions may be programmed into a multi-ported random access memory (RAM) denoted as MPR in Example 1. The MPR is described in greater detail in connection with FIG. 4.

Example 1

∀ CS∈AS:
{
  1) MPR lookup stage:
    {DIFF, NS}=MPR({IN, CS});
  2) State Control Circuit processing stage:
    if (DIFF):
      AS=AS−CS;
    AS=AS U NS;
}

The compute flow of Example 1 starts when the regular expression processing circuit receives a new IN. Initially the set of AS consists of only the starting state which is "state initial" denoted as SI in FIG. 3. The SI becomes the current state CS for the first transition. The pair {IN, CS} is used as an input address to the MPR to look up the data that is output from the MPR, e.g., the particular DIFF and NS specified by the address {IN, CS}. After each lookup, the set AS is updated per Example 1.

For any NFA process, a subset of active states exists at any current moment. When input data is received, each active state in the set of AS is transitioned to a next active state. The regular expression processing circuit processes each state in the set of AS by performing a lookup using the MPR. For each state in the set of AS, which is referred to as current state, the CS is concatenated with the current input data (e.g., character) received to form an address. The address is used to look up an NFA rule in the MPR.

From each lookup, a given output is received. In the output, if the DIFF flag is set (e.g., is equal to 1), per the compute flow of Example 1, the current state CS used to perform the lookup is removed from the set of AS. Next, regardless of the value of the DIFF flag, the next state NS that was determined by the NFA rule is added to the set of AS. The regular expression processing circuit performs this processing for each of the current states present in the set of AS. When all states of the set of AS have been processed for the received input data to generate a new set of AS, one transition for the received input has been performed. This processing may be performed until the input data is exhausted. Upon exhaustion or termination of the input data, a determination may be made as to whether the regular expression has been matched.

In one example, the MPR is implemented as a dual ported RAM. A dual ported RAM is capable of performing two lookup operations each clock cycle. As such, the MPR is capable of processing two current states of the set of AS each clock cycle. This ability provides an approximate processing speed increase of 2× over conventional regular expression processors for many regular expressions. If, while processing received data, the state final (SF0) is reached, that path of transitions is declared failed. If the input data terminates and the state SF1 is in the set of AS, then a valid match has been found for the regular expression implemented by the instructions loaded into the MPR.

FIG. 4 illustrates an example of a regular expression processing circuit (processing circuit) 400. In the example of FIG. 4, processing circuit 400 includes a multi-ported RAM (MPR) 402, which stores NFA rules 404. NFA rules 404 may be implemented as described in connection with FIG. 3. NFA rules 404 correspond to a particular regular expression. In the event that a different regular expression is to be used, new or different NFA rules corresponding to such other regular expression may be loaded into MPR 402. After the reloading, processing circuit 400 may be used to process received data according to the new regular expression.

In the example, an input character shown as IN is received. In one aspect, the input characters may be processed through back-pressure circuitry (not shown). The back-pressure circuitry may provide new input characters to processing circuit 400 as needed for processing. As shown in Example 1 above, each input character is used to transition all current active states to a next set of active states. Therefore, a new input character is not consumed from the IN stream until all active states are processed. The input character stream IN waits while the processing circuit 400 processes the previous input character by asserting a one-bit back-pressure signal. This synchronizes the external input character stream with the operations of processing circuit 400.

The input character may be ASCII encoded data. In another example implementation, processing circuit 400 may be language agnostic in that any of a variety of different types of input data may be processed. For example, the input character may be UNICODE encoded data. The input character IN is combined, e.g., concatenated, with a current state CS0 to form an address ADDR-0 (e.g., a first address) provided to a first input port of MPR 402. ADDR-0 is used to look up an NFA rule. The DIFF flag value and the next state determined from the lookup using ADDR-0 are output as NS0. The same input character IN is combined, e.g., concatenated, with a current state CS1 to form an address ADDR-1 (e.g., a second address) provided to a second input port of MPR 402. ADDR-1 is used to look up another NFA rule. The DIFF flag value and the next state determined from the lookup using ADDR-1 are output as NS1.

Since MPR 402 is dual ported, ADDR-0 and ADDR-1 are consumed in a same clock cycle. MPR 402 is capable of performing both the lookups using ADDR-0 and ADDR-1 concurrently. Thus, NS0 and NS1 are output concurrently as a result of the two lookups being performed in the same clock cycle.

Active states first-in-first-out (FIFO) memory 408 stores the set of AS as previously described. Because MPR 402 generates two possible next states on each clock cycle, up to 4 states (PS0, PS1, NS0, and NS1) need to be stored in the set of AS in active states FIFO memory 408. In the example of FIG. 4, only two states may be read out of active states FIFO memory 408 at a time. In one or more example implementations, state control circuit 406 is included to improve efficiency of storage of the states in active states FIFO memory 408.

In the example of FIG. 4, NS0 and NS1 are provided to state control circuit 406 along with CS0, which after 1 clock cycle becomes (and is relabeled) previous state 0 (PS0) and CS1, which after 1 clock cycle becomes (and is relabeled) previous state 1 (PS1). Because MPR 402 incurs a one clock cycle delay, PS0 and PS1 are provided to state control circuit 406 by delaying CS0 and CS1 by one clock cycle, respectively, as shown in FIG. 4 by way of registers 414 and 416. For example, at time T0, CS0(T0) and CS1(T0) are used to form ADDR-0 and ADDR-1. At time T1, the delayed set of CS0(T0) and CS1(T0) are provided to state control circuit 406 as PS0(T1) and PS1(T1). Also at time T1, the NS0 and NS1 determined using CS0(T0) and CS1(T0) are output. Thus, in the set of states PS0, PS1, NS0, and NS1, the PS0 and PS1 correspond to the current states CS0 and CS1 used in forming ADDR-0 and ADDR-1 used in the current lookup operations performed by MPR 402, while the NS0 and NS1 are the next states determined by the lookup operations performed using the CS0 and CS1 from the prior clock cycle.

In an example implementation, state control circuit 406 is capable of removing the previous state PS0 used to perform the lookup operation resulting in NS0 from active states FIFO memory 408 in response to determining that the DIFF flag corresponding to NS0 is set. Similarly, state control circuit 406 is capable of removing the previous state PS1 used to perform the lookup operation resulting in NS1 from active states FIFO memory 408 in response to determining that the DIFF flag corresponding to NS1 is set.

State control circuit 406 is also capable of performing one or more operations directed to improving efficiency of storage of states within, and operation of, active states FIFO memory 408. In one aspect, state control circuit 406 evaluates the received states (NS0, NS1, PS0, and PS1) and uniquifies the data set. That is, state control circuit 406 eliminates duplicates from the data set. Thus, in the case where one or more of NS0, NS1, PS0, and PS1 are duplicates, state control circuit 406 is capable of removing or deleting the duplicate(s). In another aspect, state control circuit 406 is capable of sorting the remaining states. For example, state control circuit 406 may sort or reorder the remaining states after removal of the duplicate(s). Reordering the states in the set of remaining states facilitates more efficient storage and processing of the states within active states FIFO memory 408.

In one example implementation, active states FIFO memory 408 is two states wide as two active states CS0 and CS1 can be read and processed every clock cycle. This means that only two states can be written to active states FIFO memory 408 each clock cycle. Consequently, the set of four states (NS0, NS1, PS0, and PS1) may be written to active states FIFO memory 408 in two clock cycles as pair-P1 in the first clock cycle and pair-P2 in the second clock cycle. Similarly, when reading data from active states FIFO memory 408, pair-P1 is processed in the first clock cycle and pair-P2 is processed in the second clock cycle. State control circuit 406 is capable of uniquifying the data set by replacing any duplicate states with all 1s, which is the maximum value for a state. State control circuit 406 is also capable of sorting the states in ascending order of their values. With duplicate states replaced with all 1s, the sorting that is performed moves the unique states together. If, for example, the set of states PS0, PS1, NS0, and NS1 includes only two unique states, the sorting described ensures that the unique states are located in pair-P1 (e.g., any unique states in pair-P2 are moved to pair-P1). Therefore, with only two unique states, pair-P2 can be discarded leading to lower storage requirements for active states FIFO memory 408. This improves processing and computational efficiency since pair-P2 was not stored and both the valid states are read out of active states FIFO memory 408 as pair-P1 in the same clock cycle. Otherwise, were the unique states spread across pair-P1 and pair-P2, reading both unique states would require two clock cycles. In cases where there are more than two valid unique states, two clock cycles are required. The process continues until the terminating character is seen in the input data, at which point active states FIFO memory 408 is checked for the presence of SF1.

In the example of FIG. 4, state control circuit 406 outputs the de-duplicated and sorted data set to an input port of active states FIFO memory 408 and directly to a multiplexer 410. Active states FIFO memory 408 outputs two states concurrently to multiplexer 410.

Multiplexer 410 is capable of passing either the output received from active states FIFO memory 408 (e.g., two active states therefrom read out at one time) or selected states (e.g., two) of the de-duplicated and sorted data output directly from state control circuit 406.

In one aspect, a bypass signal from control logic 412 may be asserted thereby causing multiplexer 410 to pass the selected states from state control circuit 406 when active states FIFO memory 408 is empty. For example, control logic 412 is capable of monitoring how full (or empty) active states FIFO memory 408 is at any given time. In cases where active states FIFO memory 408 is empty, the process of storing data therein and subsequently reading the data out may consume 2-3 clock cycles. This imposes a delay or processing penalty. Accordingly, control circuitry 412 is capable of asserting the bypass signal in response to determining that active states FIFO memory 408 is empty thereby causing multiplexer 410 to pass the selected states output directly from state control circuit 406. Control logic 412 de-asserts the bypass signal in response to determining that active states FIFO memory 408 includes data thereby causing multiplexer 410 to pass two active states from active states FIFO memory 408. In one aspect, control logic 412 may also indicate to state control circuit 406 when the bypass signal is asserted to prevent state control circuitry 406 from storing any states passed by multiplexer 410 within active states FIFO memory.

In another aspect, processing circuit 400 includes a check match circuit 418. Check match circuit 418 is capable of determining whether the input character is a termination character. In response to determining that the input character is a termination character, check match circuit 418 determines whether active states FIFO memory 408 includes the SF1 state indicating that the regular expression has been matched. In response to determining that the SF1 state (e.g., a final state) is contained in active states FIFO memory 408, check match circuit 418 outputs an indication (e.g., a match signal) indicating that the regular expression has been matched.

Figure 5:
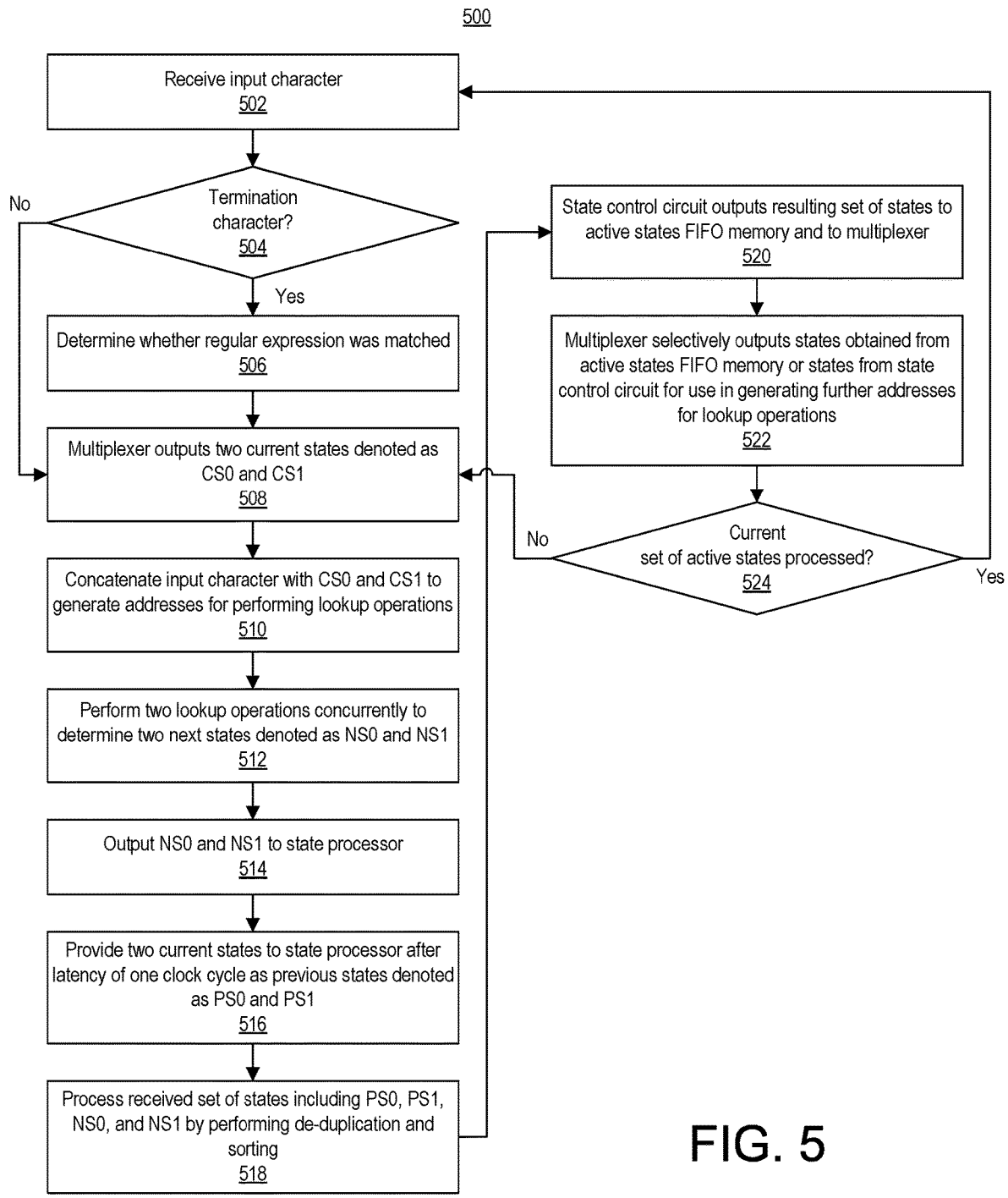
FIG. 5 illustrates an example method of operation for a regular expression processing circuit.

FIG. 5 illustrates an example method 500 of operation for a processing circuit. Method 500 may be performed by the processing circuit described in connection with FIG. 4.

In block 502, the processing circuit receives input data, e.g., a character. The input data may be a stream of input data. In block 504, the processing circuit determines whether the input character is a termination character. If so, method 500 continues to block 506 to determine whether the regular expression corresponding to the NFA rules loaded in the MPR has been matched. In one aspect, the processing circuit can provide an indication of whether the regular expression has been matched. As discussed, if the set of active states stored in the active states FIFO memory includes the SF1 state, the regular expression has been matched. If the input character is not a termination character, method 500 can continue to block 508.

In block 508, the multiplexer of the processing circuit outputs two current states denoted as CS0 and CS1. In block 510, the processing circuit concatenates the input character with CS0 to form ADDR-0 and concatenates the input character with CS1 to form ADDR-1. In block 512, the MPR looks up a first next state (NS0) using ADDR-0 and a second next state (NS1) using ADDR-1. The lookups may be performed at clock cycle 0. The MPR is capable of looking up both the first and second next states concurrently, e.g., in the same clock cycle.

In block 514, the MPR outputs the first and second next states NS0 and NS1 to the state control circuit. For example, the MPR outputs the first and second next states at clock cycle 1. In block 516, the two current states (CS0 and CS1) output from the multiplexer at clock cycle 0 are provided to the state control circuit after a one cycle delay (e.g., at clock cycle 1) as PS0 and PS1 with the first and second next states NS0 and NS1.

In block 518, the state control circuit processes the set of received states. For example, the state control circuit is capable of performing de-duplication and sorting on the received set of states that include PS0, PS1, NS0, and NS1. In block 520, the state control circuit outputs the processed set of states to the active states FIFO memory and also to the multiplexer. It should be appreciated that the state control circuit can remove one or both of previous states PS0 and/or PS1 as previously described based on the value of the DIFF flag provided with NS0 and NS1, respectively. That is, the particular previous state(s) used to look up a next state having a DIFF flag set to 1 is/are replaced with all 1's in the set PS0, PS1, NS0, and NS1 so that the uniquify and sort circuits of the state control circuit avoid writing such previous state(s) into the active states FIFO memory.

In block 522, the multiplexer selectively outputs states obtained from the active states FIFO memory or states obtained directly from the state control circuit. For example, the processing circuit can include control logic that monitors the amount of data stored in the active states FIFO memory. In response to determining that the active states FIFO memory includes no data, e.g., is empty, the control logic causes the multiplexer (e.g., via the bypass signal) to pass two selected states received from the state control circuit. In response to determining that the active states FIFO memory does include data, e.g., is not empty, the control logic causes the multiplexer to pass two states from the active states FIFO memory.

The two states output from the multiplexer correspond to new current states to be used to generate further addresses for further lookups performed by the MPR. The processing circuit continues to use the same input character until the set of active states in the active states FIFO memory is fully processed. In block 524, the processing circuit determines whether the current set of active states has been fully processed. If the current set of active states has been processed, method 500 continues to block 502. Once the set of active states is fully processed, e.g., each has been transitioned through a lookup operation performed by the MPR, a next input character is then processed (e.g., used for address generation to process the next set of active states). If the set of active states has not been processed, method 500 loops back to block 508 to continue processing using the same input character.

Figure 6:
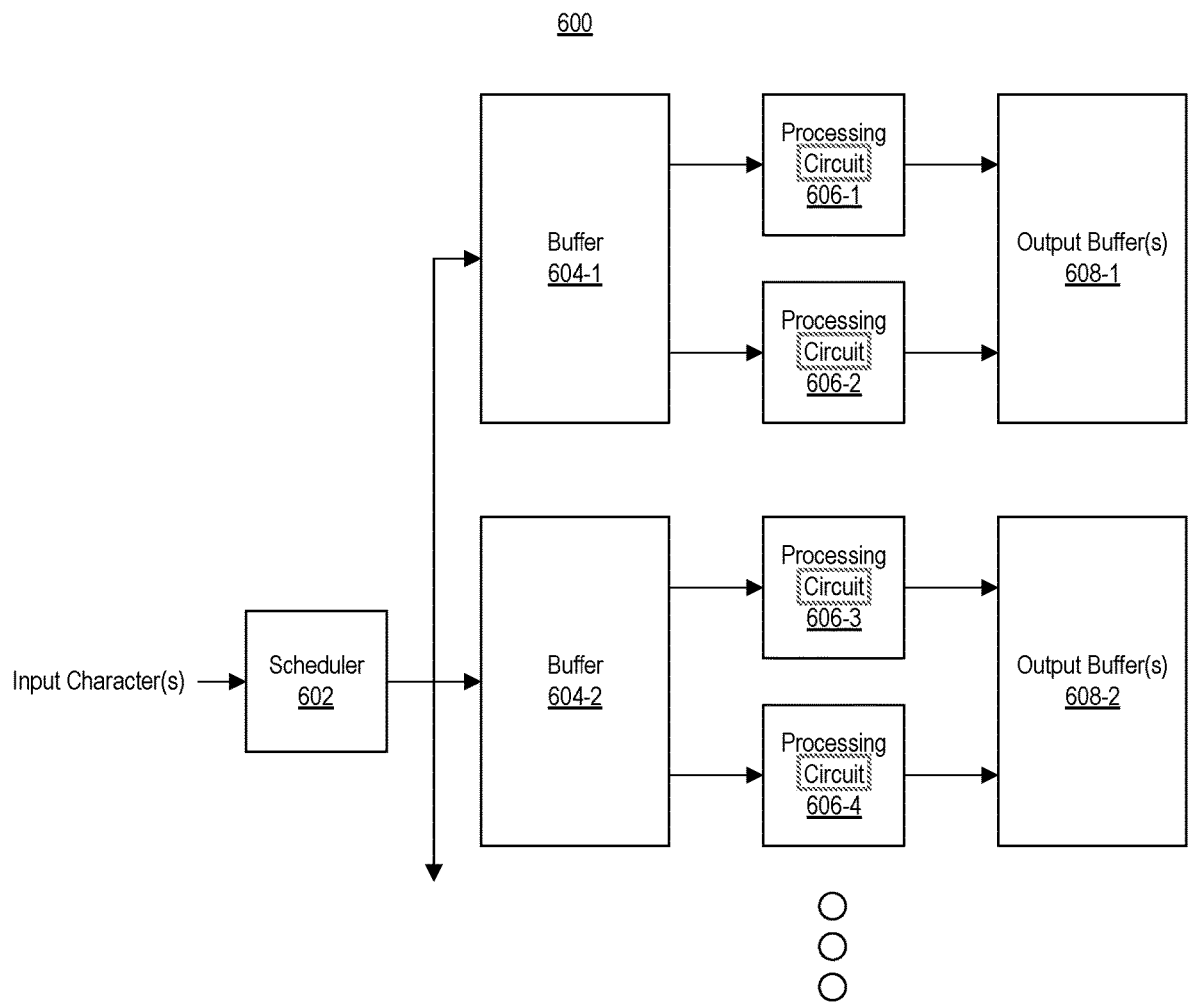
FIG. 6 illustrates an example parallel processing architecture.

FIG. 6 illustrates an example parallel processing architecture (architecture) 600. In the example of FIG. 6, a plurality of processing circuits are combined to form parallel processing architecture 600. As shown, architecture 600 includes a scheduler 602 that is coupled to one or more buffers 604. Each of buffers 604 is implemented as a multi-port buffer and is coupled to two processing circuits 606. Each of processing circuits 606 may be implemented as described within this disclosure in connection with FIGS. 4 and 5.

While FIG. 6 shows 4 different processing circuits 606, it should be appreciated that architecture 600 may be scaled up to include a greater number of processing circuits 606. For example, architecture 600 may be scaled up to include 8, 16, or 32 processing circuits 606.

Architecture 600 supports two stage dynamic scheduling as implemented using scheduler 602 and buffers 604. Referring to processing circuits 606, the amount of time required to process a given amount of data, e.g., a page of data, depends on the content of the data itself. Consequently, the amount of time for any one of processing circuits 606 to complete processing a page of data is not known. Thus, even in the case where processing circuits 606 start processing different pages of data at the same time, processing circuits 606 may not finish at the same time as each processing circuit may operate on an independent data stream.

In one aspect, data to be operated on may be preprocessed before reaching scheduler 602. The input data, for example, may be divided into fixed sized portions referred to as pages. Each page is, in effect, an independent set of data in that each page has a valid start and a valid end (e.g., is a valid string) and is independent of each other page of data.

Scheduler 602 writes pages to buffers 604. In one aspect, scheduler 602 monitors the amount of data stored in each of buffers 604 and writes data, e.g., pages, to those buffers 604 that have available (e.g., empty) space to receive a further page or pages. Scheduler 602, for example, may prioritize writing to the buffer 604 with the most available (e.g., empty) space and, as such, that stores the least data. This ensures that buffers 604 store a balanced amount of data to keep processing circuits 606 busy.

Processing circuits 606 are capable of obtaining pages from the corresponding buffers 604. For example, each buffer 604 feeds two different processing circuits 606 via separate ports. That is, processing circuit 606-1 is coupled to buffer 604-1 via a first port of buffer 604-1, while processing circuit 606-2 is coupled to buffer 604-2 via a second port of buffer 604-1.

In one aspect, each processing circuit 606 is capable of indicating when the final row of a page has been read and processed and/or whether or not the data was matched. In one example, the indication is the indication that the regular expression has been matched by the processing circuit 606. The indication from processing circuit 606 specifying whether the regular expression has been matched, in combination with the last portion of the page currently being processed by the processing circuit being read from the corresponding buffer 604 indicates that the processing of the page is complete and that the processing circuit 606 is ready to process or consume a further page.

For example, buffers 604 may be fixed in size. Processing circuits 606 require that there is at least one complete row for processing in the data stored in the buffer (e.g., a page). The data in the buffer (e.g., at least one complete row) may or may not be matched. The row being processed, however, should not be larger than the size of the buffer. Each processing circuit 606 is capable of outputting a non-match as 0 and a match as 1. Accordingly, when the data is fully consumed without a match (e.g., the match output from each processing circuit 606 is 0), architecture 600 still generates at least one decision (e.g., that data was matched or not) for a given buffer of data.

In one aspect, each of processing circuits 606 may contain the same set of NFA rules corresponding to the same regular expression to provide parallel processing of one or more data streams. In other aspects, however, different ones of processing circuits 606 may be loaded with NFA rules corresponding to different regular expressions.

Each processing circuit 606 is connected to an output buffer 608. In the example of FIG. 6, each output buffer is connected to 2 processing circuits 606. In other example implementations, each output buffer 608 is connected to one processing circuit 606. In still other example implementations, more than 2 processing circuits 606 may be connected to a single output buffer 608. In any case, each processing circuit 606 is capable of generating an output signal indicating whether the regular expression specified by the NFA rules of the processing circuit 606 was matched for the page of data being processed.

Architecture 600 implements two-stage, dynamic, greedy load balancing scheduling that dispatches pages of input data into multiple processing circuits 606. In the first stage, two processing circuits 606 share a multi-port (e.g., a dual port) buffer 604 for input strings with each processing circuit 606 reading from a different port of the buffer 604. Each buffer 604 may contain multiple pages of input data that are dynamically assigned to the next free processing circuit 606 among the pair.

In the second stage, scheduler 602 immediately dispatches a new page to the buffer 604 that has been fully consumed (e.g., is empty). Processing circuits 606 each is assigned space in output buffers 608. Thus, processing circuits 606 are capable of writing in parallel fashion to their respective assigned spaces in the output buffers 608 to ensure non-blocking operation until results are moved out of output buffers 608 to other destinations (e.g., off-chip). The results may be moved out of output buffers 608 in the sequence in which the pages arrive for processing. This leads to high throughput operation of architecture 600.

Figure 7:
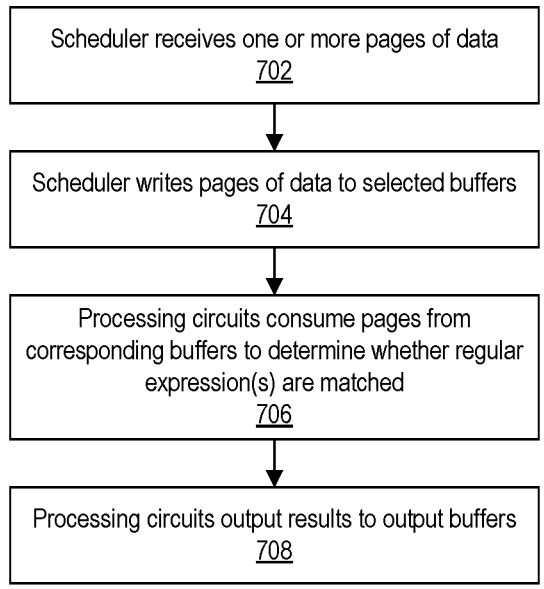
FIG. 7 illustrates an example method of operation for a parallel processing architecture.

FIG. 7 illustrates an example method 700 of operation for a parallel processing architecture. Method 700 may be performed by architecture 600 described in connection with FIG. 6.

In block 702, the scheduler receives one or more pages of data. In block 704, the scheduler writes the pages to the buffers. For example, for each page to be written, the scheduler is capable of selecting a buffer with available space to receive the page. In one aspect, the scheduler is capable of selecting the buffer that includes the largest amount of free or available space, writing a page to that buffer, and iterating the process.

In block 706, the processing circuits consume pages from the buffer and process the pages to determine whether the regular expression in each of the processing circuits has been matched. As discussed, the processing circuits may complete processing of pages at different times. Upon completion of processing a page, each processing circuit may begin processing a different page obtained from the buffer that is coupled to the processing circuit.

In block 708, the processing circuits output results to the output buffers. The results, for example, indicate whether the regular expression in each respective processing circuit was matched for the page of data processed.

While FIG. 7 is generally described sequentially, it should be appreciated that each portion of the parallel processing architecture is capable of operating concurrently in parallel to increase throughput.

Figure 8:
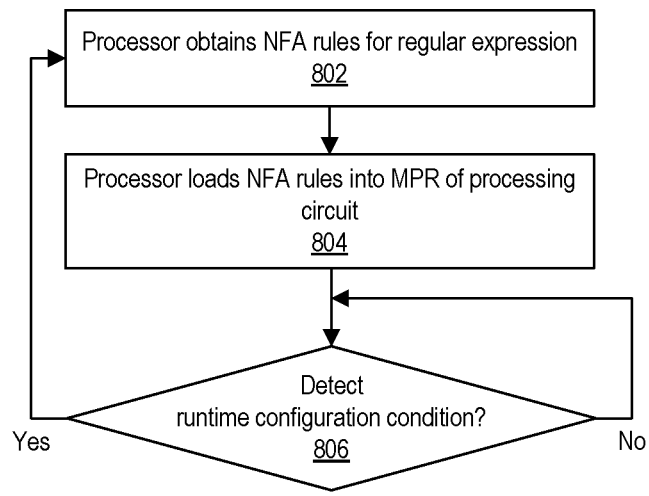
FIG. 8 illustrates an example method of runtime configuration of a regular expression processing circuit.

FIG. 8 illustrates an example method 800 of runtime configuration of a processing circuit. Method 800 illustrates the loading of new NFA rules into a processing circuit. Method 800 is referred to as "runtime" in that the processing circuit is already implemented in circuitry. For example, the processing circuit (or the parallel processing architecture) may be implemented in an ASIC or in programmable circuitry of a programmable IC. In the latter case, the programmable IC is already configured to implement the processing circuit(s). As such, new configuration data (e.g., configuration bitstreams) need not be loaded into the programmable IC for runtime configuration. Rather, only new NFA rules need be loaded within the MPR of the various processing circuits.

In block 802, a processor obtains NFA rules for a regular expression. The processor may generate the NFA rules from the regular expression as described within this disclosure or obtain previously generated NFA rules from a storage device. In block 804, the processor loads the NFA rules into the MPR of the processing circuit. In block 806, the processing circuit, being loaded with the NFA rules, begins processing data.

In block 806, the processor determines whether a runtime configuration condition is detected for the processing circuit. In response to detecting a runtime configuration condition, method 800 loops back to block 802 where the processor obtains NFA rules corresponding to a different regular expression. If a runtime configuration condition is not detected, method 800 may continue to loop allowing the processor circuit to continue processing data while awaiting a runtime configuration condition. The runtime configuration condition may be application software executing on the processor initiating or requesting runtime configuration of the processing circuit or circuits (e.g., runtime configuration of architecture 600 of FIG. 6) as the case may be. The runtime configuration condition may be another system external to the IC including the processing circuit(s) and/or a system other than one including the processor that issues such a request.

Method 800 illustrates that the processing circuit(s) are reprogrammable at runtime to process data in accordance with regular expressions that may be changed over time. The runtime configuration described requires significantly less time than performing a conventional reconfiguration of programmable logic by loading a new configuration bitstream into the programmable IC. Further, in the case of an ASIC, the processing circuits still are programmable despite being implemented in hardened circuitry (e.g., without the use of programmable logic).

With regard to NFA processing on programmable ICs such as Field Programmable Gate Arrays (FPGAs), regular expressions are conventionally compiled into a deterministic finite automata (DFA) that performs automata transitions. The custom transition conditions are then implemented in the programmable logic of the programmable IC. With this approach for DFAs, however, even a small NFA may include anywhere from a few hundred to many thousands of states. This translates into high logic utilization for relatively simple regular expressions particularly when repetitive operators such as "k", "+", and "{,}" are used. Moreover, this type of conventional architecture can result in long latencies where many clock cycles (e.g., thousands) pass prior to resolving a match. In addition, such architectures are custom configuration bitstreams for each different regular expression and are not runtime configurable as described herein. Thus, using a new regular expression requires re-compiling and re-programming the programmable IC, which can be time consuming.

In another aspect, the processing circuits of FIG. 4 may be pipelined to improve timing by implementing support for context switching. For example, output registers can be added to MPR 402 in FIG. 4 to improve lookup frequency. In that case, more than one clock cycle is required for the lookup output to appear at the output ports of MPR 402. To perform lookups with the next input character on any input stream, the lookup result of the previous character should have finished. Accordingly, there will be empty clock cycles while the next input character waits for the previous input lookups to finish leading to a "bubble" in the pipeline. To counter the bubble, two or more independent blocks (e.g., pages) of input streams can be consumed simultaneously by interleaving lookups for the streams every other cycle. This interleaving may be performed to fill the pipeline bubble between MPR data output to the next MPR lookup. The pipelining may also improve timing closure. The interleaving further results in the sharing of an MPR between two input streams leading to further performance improvements (e.g., a 2× performance improvement).

The examples described herein may be employed in a wide variety of applications with varied resource requirements. The processing circuits can act as standalone regular expression processing engines consuming data directly from a host system or can be incorporated into a larger design with streaming interfaces with the dynamic scheduler as illustrated in FIG. 6.

Figure 9:
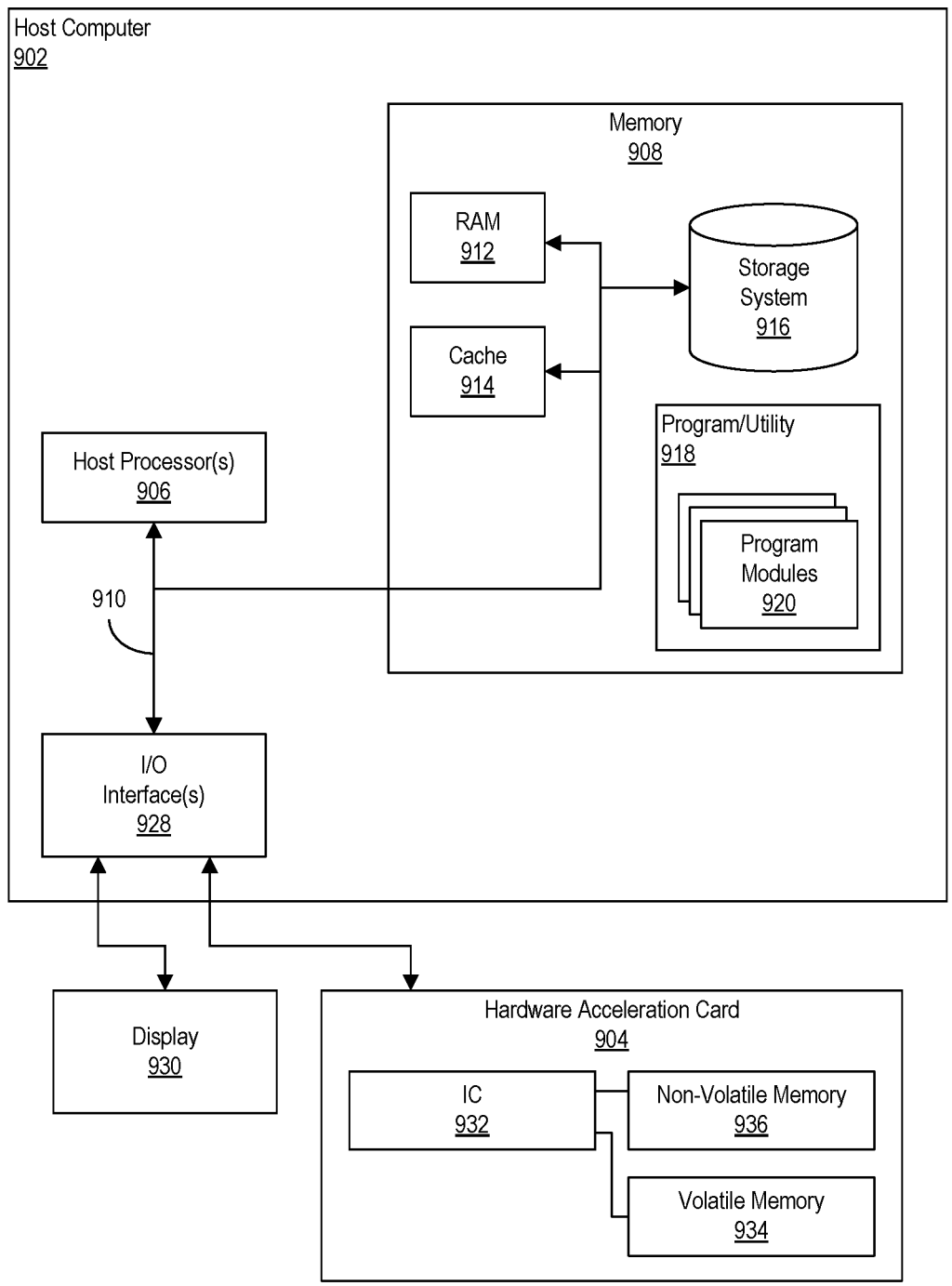
FIG. 9 illustrates an example computing environment useful for implementing the inventive arrangements described herein.

FIG. 9 illustrates an example computing environment 900 useful for implementing the inventive arrangements described herein. Computing environment 900 includes a host data processing system (host system) 902 coupled to a hardware acceleration card (card) 904. The components of host system 902 may include, but are not limited to, one or more processors 906 (e.g., central processing units), a memory 908, and a bus 910 that couples various system components including memory 908 to processor(s) 906. Processor(s) 906 may include any of a variety of processors that are capable of executing program code. Example processor types include, but are not limited to, processors having an x86 type of architecture (IA-32, IA-64, etc.), Power Architecture, ARM processors, and the like.

Bus 910 represents one or more of any of several types of communication bus structures, including a memory bus or memory controller, a peripheral bus, an accelerated graphics port, and a processor or local bus using any of a variety of available bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Host system 902 typically includes a variety of computer readable media. Such media may be any available media that is accessible by host system 902 and may include any combination of volatile media, non-volatile media, removable media, and/or non-removable media.

Memory 908 may include computer readable media in the form of volatile memory, such as random-access memory (RAM) 912 and/or cache memory 914. Host system 902 may also include other removable/non-removable, volatile/non-volatile computer system storage media. By way of example, storage system 916 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each may be connected to bus 910 by one or more data media interfaces. As will be further depicted and described below, memory 908 may include at least one computer program product having a set (e.g., at least one) of program modules (e.g., program code) that are configured to carry out the functions and/or operations described within this disclosure.

For example, program/utility 918, having a set (at least one) of program modules 920 which may include, but are not limited to, an operating system, one or more application programs (e.g., user applications), other program modules such as regular expression compiler 104, and/or program data, is stored in memory 908. Program modules 920 generally carry out the functions and/or methodologies as described herein at least with respect to operations performed by host system 902 (e.g., processor 102 of FIG. 1). For example, program modules 920 may implement a software stack. The software stack may implement a runtime environment capable of performing the host system 902 operations described herein. In one aspect, program modules 920 includes a driver or daemon capable of communicating with IC 932.

Program/utility 918 is executable by processor(s) 906. Program/utility 918 and any data items used, generated, and/or operated upon by processor(s) 906 are functional data structures that impart functionality when employed by processor(s) 906. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Host system 902 may include one or more Input/Output (I/O) interfaces 928 communicatively linked to bus 910. I/O interface(s) 928 allow host system 902 to communicate with external devices, couple to external devices that allow user(s) to interact with host system 902, couple to external devices that allow host system 902 to communicate with other computing devices, and the like. For example, host system 902 may be communicatively linked to a display 930 and to hardware acceleration card 904 through I/O interface(s) 928. Host system 902 may be coupled to other external devices such as a keyboard (not shown) via I/O interface(s) 928. Examples of I/O interfaces 928 may include, but are not limited to, network cards, modems, network adapters, hardware controllers, etc.

In an example implementation, the I/O interface 928 through which host system 902 communicates with hardware acceleration card 904 is a PCIe adapter. Hardware acceleration card 904 may be implemented as a circuit board that couples to host system 902. Hardware acceleration card 904 may, for example, be inserted into a card slot, e.g., an available bus and/or PCIe slot, of host system 902.

Hardware acceleration card 904 includes an IC 932. In one aspect, IC 932 is an ASIC. In another aspect, IC 932 is a programmable IC such as an FPGA. Hardware acceleration card 904 also includes volatile memory 934 coupled to IC 932 and a non-volatile memory 936 also coupled to IC 932. Volatile memory 934 may be implemented as a RAM that is external to IC 932, but is still considered a "local memory" of IC 932, whereas memory 908, being within host system 902, is not considered local to IC 932. In some implementations, volatile memory 934 may include multiple gigabytes of RAM, e.g., 64 GB of RAM. Non-volatile memory 936 may be implemented as flash memory. Non-volatile memory 936 is also external to IC 932 and may be considered local to IC 932.

FIG. 9 is not intended to suggest any limitation as to the scope of use or functionality of the examples described herein. Host system 902 is an example of computer hardware (e.g., a system) that is capable of performing the various operations described within this disclosure relating to hardware acceleration card 904 and/or IC 932. The example processing circuit(s) and/or architectures as described herein in connection with FIGS. 4 and 6 may be implemented in IC 932.

In one aspect, processor 906 is capable of generating NFA rules and downloading such NFA rules into the MPR of one or more processing circuits implemented in IC 932. Processor 906, for example, may load different NFA rules in the processing circuit(s) over time as may be required. For example, processor 906 is capable of loading different NFA rules in response to detecting runtime configuration conditions as described herein.

Host system 902 is only one example implementation of a computer that may be used with a hardware acceleration card. Host system 902 is shown in the form of a computing device, e.g., a computer or server. Host system 902 can be practiced as a standalone device, as a bare metal server, in a cluster, or in a distributed cloud computing environment. In a distributed cloud computing environment, tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

Some computing environments, e.g., cloud computing environments and/or edge computing environments using host system 902 or other suitable data processing system, generally support the FPGA-as-a-Service (FaaS) model. In the FaaS model, user functions are hardware accelerated as circuit designs implemented within programmable ICs operating under control of the (host) data processing systems. Other examples of cloud computing models are described in the National Institute of Standards and Technology (NIST) and, more particularly, the Information Technology Laboratory of NIST.

Host system 902 is operational with numerous other general-purpose or special-purpose computing system environments or configurations. Examples of computing systems, environments, and/or configurations that may be suitable for use with host system 902 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 10:
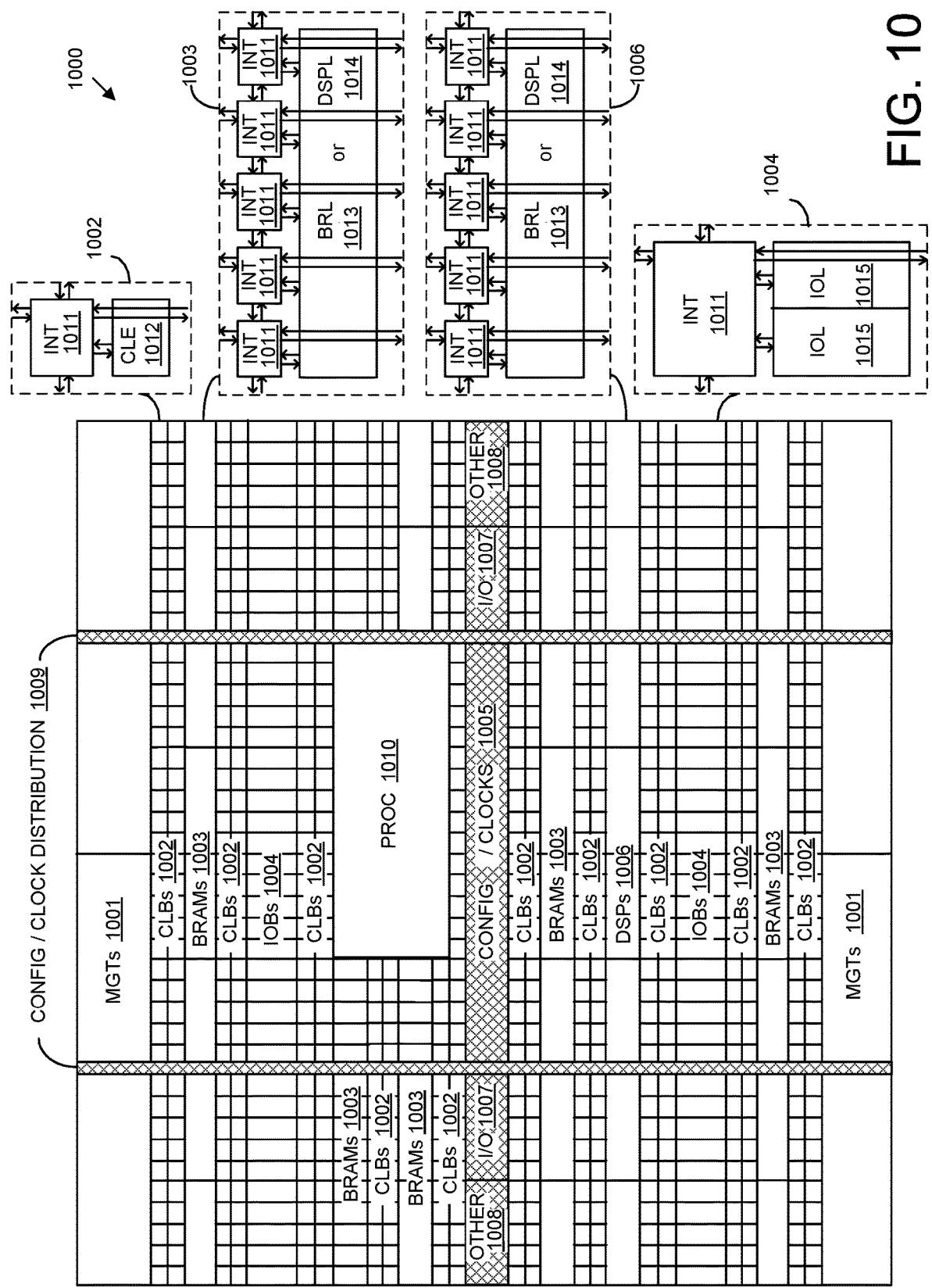
FIG. 10 illustrates an example architecture for an integrated circuit useful for implementing the inventive arrangements described herein.

FIG. 10 illustrates an example architecture 1000 for an IC. In one aspect, architecture 1000 may be implemented within a programmable IC. For example, architecture 1000 may be used to implement a field programmable gate array (FPGA). Architecture 1000 may also be representative of a system-on-chip (SoC) type of IC. An SoC is an IC that includes a processor that executes program code and one or more other circuits. The other circuits may be implemented as hard-wired circuitry, programmable circuitry, and/or a combination thereof. The circuits may operate cooperatively with one another and/or with the processor.

As shown, architecture 1000 includes several different types of programmable circuit, e.g., logic, blocks. For example, architecture 1000 may include a large number of different programmable tiles including multi-gigabit transceivers (MGTs) 1001, configurable logic blocks (CLBs) 1002, random access memory blocks (BRAMs) 1003, input/output blocks (IOBs) 1004, configuration and clocking logic (CONFIG/CLOCKS) 1005, digital signal processing blocks (DSPs) 1006, specialized I/O blocks 1007 (e.g., configuration ports and clock ports), and other programmable logic 1008 such as digital clock managers, analog-to-digital converters, system monitoring logic, and so forth.

In some ICs, each programmable tile includes a programmable interconnect element (INT) 1011 having standardized connections to and from a corresponding INT 1011 in each adjacent tile. Therefore, INTs 1011, taken together, implement the programmable interconnect structure for the illustrated IC. Each INT 1011 also includes the connections to and from the programmable logic element within the same tile, as shown by the examples included at the right of FIG. 10.

For example, a CLB 1002 may include a configurable logic element (CLE) 1012 that may be programmed to implement user logic plus a single INT 1011. A BRAM 1003 may include a BRAM logic element (BRL) 1013 in addition to one or more INTs 1011. Typically, the number of INTs 1011 included in a tile depends on the height of the tile. As pictured, a BRAM tile has the same height as five CLBs, but other numbers (e.g., four) also may be used. A DSP tile 1006 may include a DSP logic element (DSPL) 1014 in addition to an appropriate number of INTs 1011. An 10B 1004 may include, for example, two instances of an I/O logic element (IOL) 1015 in addition to one instance of an INT 1011. The actual I/O pads connected to IOL 1015 may not be confined to the area of IOL 1015.

In the example pictured in FIG. 10, a horizontal area near the center of the die, e.g., formed of regions 1005, 1007, and 1008, may be used for configuration, clock, and other control logic. Vertical areas 1009 extending from this horizontal area may be used to distribute the clocks and configuration signals across the breadth of the programmable IC.

Some ICs utilizing the architecture illustrated in FIG. 10 include additional logic blocks that disrupt the regular columnar structure making up a large part of the IC. The additional logic blocks may be programmable blocks and/or dedicated circuitry. For example, a processor block depicted as PROC 1010 spans several columns of CLBs and BRAMs.

In one aspect, PROC 1010 may be implemented as dedicated circuitry, e.g., as a hardwired processor, that is fabricated as part of the die that implements the programmable circuitry of the IC. PROC 1010 may represent any of a variety of different processor types and/or systems ranging in complexity from an individual processor, e.g., a single core capable of executing program code, to an entire processor system having one or more cores, modules, coprocessors, interfaces, or the like.

In another aspect, PROC 1010 may be omitted from architecture 1000 and replaced with one or more of the other varieties of the programmable blocks described. Further, such blocks may be utilized to form a "soft processor" in that the various blocks of programmable circuitry may be used to form a processor that can execute program code as is the case with PROC 1010.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 10 that are external to PROC 1010 such as CLBs 1002 and BRAMs 1003 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 1010.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SoC, the configuration bitstream may specify the circuitry that is to be implemented within the programmable circuitry and the program code that is to be executed by PROC 1010 or a soft processor. In some cases, architecture 1000 includes a dedicated configuration processor that loads the configuration bitstream to the appropriate configuration memory and/or processor memory. The dedicated configuration processor does not execute user-specified program code. In other cases, architecture 1000 may utilize PROC 1010 to receive the configuration bitstream, load the configuration bitstream into appropriate configuration memory, and/or extract program code for execution.

FIG. 10 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the right of FIG. 10 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 1010 within the IC are for purposes of illustration only and are not intended as limitations.

In one example implementation, the processing circuit of FIG. 4 and the architecture of FIG. 6 may be implemented in a programmable IC such as one having an architecture the same as or similar to that of FIG. 10. In one aspect, for example, programmable logic may be used to implement the processing circuit of FIG. 4 and/or the architecture of FIG. 6. For instance, one or more BRAMs may be used to implement an MPR 402, buffers 604, and/or output buffers 608. In other cases, larger multi-ported memories such as Ultra RAMs (URAMs) may be used to implement buffers 604 and/or output buffers 608.

In the case where the IC includes an embedded processor such as PROC 1010, whether hardwired or soft, PROC 1010 may be used to perform operations attributed to processor 102 and/or 906 such generating NFA rules, loading NFA rules within one or more MPRs to configure the processing circuit(s) at runtime as described.

Example implementations described herein, whether implemented in an ASIC or in a programmable IC, are capable of operating with low latency. For example, the architectures described herein may provide a latency of approximately a few hundred cycles depending on the complexity of the regular expressions. Further, the examples described herein are capable of consuming 1 character per clock cycle in some cases, thereby providing a throughput equal to or exceeding many high end server processors. For example, the example implementations described herein are capable of providing sustained throughputs of approximately 10-20 GB/s and provide approximately 100× or more speed increase over CPUs executing software based regular expression engines for certain regular expressions. The example implementations described herein may be included within one or more other circuits and/or systems when implemented in an ASIC or in a programmable IC.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "processor" means at least one circuit capable of carrying out instructions contained in program code. The circuit may be an integrated circuit or embedded in an integrated circuit.

As defined herein, the term "soft" in reference to a circuit means that the circuit is implemented in programmable logic or programmable circuitry. Thus, a "soft processor" means at least one circuit implemented in programmable circuitry that is capable of carrying out instructions contained in program code.

As defined herein, the term "output" means storing in physical memory elements, e.g., devices, writing to display or other peripheral output device, sending or transmitting to another system, exporting, or the like.

As defined herein, the term "real time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

In one aspect, a processing circuit includes a RAM configured to look Lip a first next state based on a first address simultaneously with looking up a second next state based on a second address. The first address is formed of a first current state and an input data and the second address is formed of a second current state and the input data. The processing circuit can include a FIFO memory configured to store selected ones of the first and second next states, a first prior state, and a second prior state as active states. The processing circuit can include a multiplexer configured to selectively pass two active states from the FIFO memory or two states selected from the first and second next states and the first and second prior states as a third current state and a fourth current state corresponding to a next clock cycle. The third current state and the fourth current state corresponding to the next clock cycle are used to look up further next states from the RAM.

The foregoing and other implementations can each optionally include one or more of the following features, alone or in combination. Further, one or more implementations include all the following features in combination.

The third current state can be used with a next input data as a portion of a first address for the next clock cycle and the third output state can be used with the next input data as a portion of a second address for the next clock cycle.

The processing circuit can include a state control circuit configured to remove duplicates from the first and second next states and the first and second current states to generate a set of remaining states and sort the set of remaining states before storing the sorted set of remaining states in the FIFO memory as active states.

The RAM can be implemented as a dual port RAM.

The RAM can store a plurality of non-deterministic finite automata rules used to look up the first and second next states.

The RAM can be loaded with a different plurality of non-deterministic finite automata rules to process data based on a different regular expression during runtime.

The multiplexer can be configured to pass the two states selected from the first and second next states and the first and second current states as the third and fourth current states corresponding to the next clock cycle in response to determining that the FIFO memory is empty.

In another aspect, a method includes forming a first address from a first current state and an input data and a second address from a second current state and the input data, looking up, using the RAM, a first next state based on the first address simultaneously with looking up a second next state based on the second address, and selectively storing, within a FIFO memory, selected ones of the first and second next states, a first prior state, and a second prior state as active states. The method can include selectively passing two active states from the FIFO memory or two states selected from the first and second next states and the first and second prior states as a third current state and a fourth current state corresponding to a next clock cycle. The third current state and the fourth current state corresponding to the next clock cycle can be used to look up further next states from the RAM.

The foregoing and other implementations can each optionally include one or more of the following features, alone or in combination. Further, one or more implementations include all the following features in combination.

The method can include using the third current state and a next input data as a first address for the next clock cycle and the fourth current state and the next input data as a second address for the next clock cycle.

The method can include removing duplicates from the first and second next states and the first and second prior states to generate a set of remaining states and sorting the set of remaining states before storing the sorted set of remaining states in the FIFO memory as active states.

The RAM can be a dual port RAM such that the looking up the first next state and the looking up the second next state occur on a same clock cycle on different ports of the dual port RAM.

The method can include storing, within the RAM, a plurality of non-deterministic finite automata rules used to look up the first and second next states based on a regular expression.

The method can include loading the RAM with a different plurality of non-deterministic finite automata rules to process data based on a different regular expression.

The selectively passing can include passing the two states selected from the first and second next states and the first and second prior states as the third current state and the fourth current state in response to determining that the FIFO memory is empty.

In another aspect, a system can include a scheduler configured to receive input data and a plurality of buffers coupled to the scheduler. Each buffer can include a plurality of ports. The scheduler can write pages of the input data into respective ones of the plurality of buffers. The system can include a plurality of regular expression processing circuits, wherein each buffer of the plurality of buffers has at least a first regular expression processing circuit connected to a first port and a second regular expression processing circuit connected to a second port. Each of the plurality of regular expression processing circuits can operate on the pages of the input data in parallel.

The foregoing and other implementations can each optionally include one or more of the following features, alone or in combination. Further, one or more implementations include all the following features in combination.

The scheduler can be configured to write the pages of the input data to the plurality of buffers based on which of the plurality of buffers has available space for receiving at least one of the pages of the input data.

Each of the plurality of regular expression processing circuits can be configured to request a further page of the input data from the buffer connected thereto in response to completing processing of a prior page of the input data.

Each of the plurality of regular expression processing circuits can be configured to process a same regular expression.

Each of the plurality of regular expression processing circuits can be configured to process a different data stream.

Each of the plurality of regular expression processing circuits can be configurable to process different regular expressions by loading different non-deterministic finite automata rules therein during runtime.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A processing circuit, comprising:
    a random access memory (RAM) configured to look up a first next state based on a first address simultaneously with looking up a second next state based on a second address for a selected clock cycle;
    wherein the first address is formed of a first current state and an input data and the second address is formed of a second current state and the input data;
    a state control circuit configured to receive the first and second next states, the first current state, and the second current state;
    a first-in-first-out (FIFO) memory coupled to the state control circuit, wherein the FIFO memory is configured to store selected ones of the first and second next states, the first current state, and the second current state as output from the state control circuit; and
    a multiplexer coupled to the state control circuit and the FIFO memory, wherein the multiplexer is configured to selectively pass, as a third current state and a fourth current state, two states from the FIFO memory or two states output from the state control circuit; and
    wherein the third current state and the fourth current state are used to look up further next states from the RAM.

2. The processing circuit of claim 1, wherein the third current state is used with the input data as a portion of a first address for a subsequent clock cycle and the fourth current state is used with the input data as a portion of a second address for the subsequent clock cycle.

3. The processing circuit of claim 1, wherein:
    the state control circuit is configured to remove duplicates from the first and second next states and the first and second current states to generate a set of remaining states and sort the set of remaining states before storing the sorted set of remaining states in the FIFO memory.

4. The processing circuit of claim 1, wherein the RAM is a dual port RAM.

5. The processing circuit of claim 1, wherein the RAM stores a plurality of non-deterministic finite automata rules used to look up the first and second next states, wherein the plurality of non-deterministic finite automata rules specify a regular expression.

6. The processing circuit of claim 5, wherein the RAM is loaded with a different plurality of non-deterministic finite automata rules to process data based on a different regular expression during runtime.

7. The processing circuit of claim 1, wherein the multiplexer is configured to pass the two states output from the state control circuit as the third and fourth current states in response to determining that the FIFO memory is empty.

8. A method, comprising:
    forming a first address from a first current state and an input data and a second address from a second current state and the input data;
    for a selected clock cycle, looking up, using a random access memory (RAM), a first next state based on the first address simultaneously with looking up a second next state based on the second address;
    processing the first and second next states and the first and second current states using a state control circuit by removing duplicates from the first and second next states and the first and second current states to generate a set of remaining states and sorting the set of remaining states;
    selectively storing, within a first-in-first-out (FIFO) memory, the set of remaining states, as sorted; and
    selectively passing, as a third current state and a fourth current state, two states from the FIFO memory or two states selected from the set of remaining states as sorted and provided from the state control circuit; and
    wherein the third current state and the fourth current state are used to look up further next states from the RAM.

9. The method of claim 8, further comprising:
    using the third current state and the input data as a first address for a subsequent clock cycle and the fourth current state and the input data as a second address for the subsequent clock cycle.

10. The method of claim 8, wherein the RAM is a dual port RAM and the looking up the first next state and the looking up the second next state occur on a same clock cycle on different ports of the dual port RAM.

11. The method of claim 8, further comprising:
storing, within the RAM, a plurality of non-deterministic finite automata rules used to look up the first and second next states based on a regular expression.

12. The method of claim 11, further comprising:
loading the RAM with a different plurality of non-deterministic finite automata rules to process data based on a different regular expression.

13. The method of claim 8, wherein the selectively passing comprises:
passing the two states selected from the set of remaining states as sorted and provided from the state control circuit in response to determining that the FIFO memory is empty.

* * * * *